United States Patent
Noesgaard et al.

(10) Patent No.: US 7,113,809 B2
(45) Date of Patent: Sep. 26, 2006

(54) APPARATUS AND A METHOD FOR PROVIDING INFORMATION TO A USER

(75) Inventors: Mads Osterby Noesgaard, Copenhagen (DK); Bruno Pichler, Vöhringen (DE)

(73) Assignee: Nokia Corporation, (FI)

( * ) Notice: Subject to any disclaimer, the term of this patent is extended or adjusted under 35 U.S.C. 154(b) by 295 days.

(21) Appl. No.: 10/322,551

(22) Filed: Dec. 19, 2002

(65) Prior Publication Data

US 2004/0121823 A1 Jun. 24, 2004

(51) Int. Cl.
*H04M 3/00* (2006.01)
*H04M 1/00* (2006.01)
*H04B 1/38* (2006.01)
*G06F 3/00* (2006.01)
*G06F 9/00* (2006.01)

(52) U.S. Cl. .................. 455/566; 455/418; 455/419; 455/574; 345/211; 345/212; 345/213; 715/867

(58) Field of Classification Search ............. 455/575.1, 455/566, 574, 418, 419; 345/211, 212, 213; 715/867

See application file for complete search history.

(56) References Cited

U.S. PATENT DOCUMENTS

| | | | |
|---|---|---|---|
| 5,437,036 A * | 7/1995 | Stamps et al. ............... | 719/328 |
| 5,680,535 A | 10/1997 | Harbin et al. | |
| 5,738,527 A | 4/1998 | Lundberg | |
| 5,819,284 A | 10/1998 | Farber et al. | |
| 5,850,220 A | 12/1998 | Motai | |
| 5,852,436 A | 12/1998 | Franklin et al. | |
| 5,870,683 A | 2/1999 | Wells et al. | |
| 5,881,299 A | 3/1999 | Nomura et al. | |
| 5,886,689 A | 3/1999 | Chee et al. | |
| 5,980,264 A | 11/1999 | Lundberg | |
| 6,084,583 A | 7/2000 | Gerszberg et al. | |
| 6,145,083 A | 11/2000 | Shaffer et al. | |
| 6,256,008 B1 | 7/2001 | Sparks et al. | |
| 6,288,715 B1 | 9/2001 | Bain et al. | |
| 6,507,351 B1 * | 1/2003 | Bixler ........................ | 715/810 |
| 6,516,421 B1 | 2/2003 | Peters | |
| 2002/0055992 A1 * | 5/2002 | King et al. .................. | 709/221 |
| 2002/0196294 A1 * | 12/2002 | Sesek .......................... | 345/867 |
| 2003/0169306 A1 * | 9/2003 | Makipaa et al. ............. | 345/864 |
| 2003/0203731 A1 * | 10/2003 | King et al. .................. | 455/407 |
| 2004/0075701 A1 * | 4/2004 | Ng ............................... | 345/867 |

FOREIGN PATENT DOCUMENTS

| | | |
|---|---|---|
| DE | 100 65 211 A1 | 5/2002 |
| EP | 0 733 983 A2 | 9/1996 |
| JP | 09-097029 | 4/1997 |

(Continued)

OTHER PUBLICATIONS

*SETI@home* The Search for Extraterrestrial Intelligence, printed Mar. 12, 2003, http://setiahomes.ssl.Berkeley.edu.

(Continued)

*Primary Examiner*—George Eng
*Assistant Examiner*—Wesley Kim
(74) *Attorney, Agent, or Firm*—Banner & Witcoff, Ltd.

(57) ABSTRACT

A screen saver for a wireless terminal, such as a mobile telephone, calendar or the like. The screen saver derives information from the applications of the terminal and shows calendar items, to-do-items, mails/SMS'es/MMS'es, and other items to the user during the idle state of the terminal. The user may define which information is shown or not shown. New applications added may subscribe to the screen saver and there through show information on the screen saver.

29 Claims, 1 Drawing Sheet

FOREIGN PATENT DOCUMENTS

Figure 1:
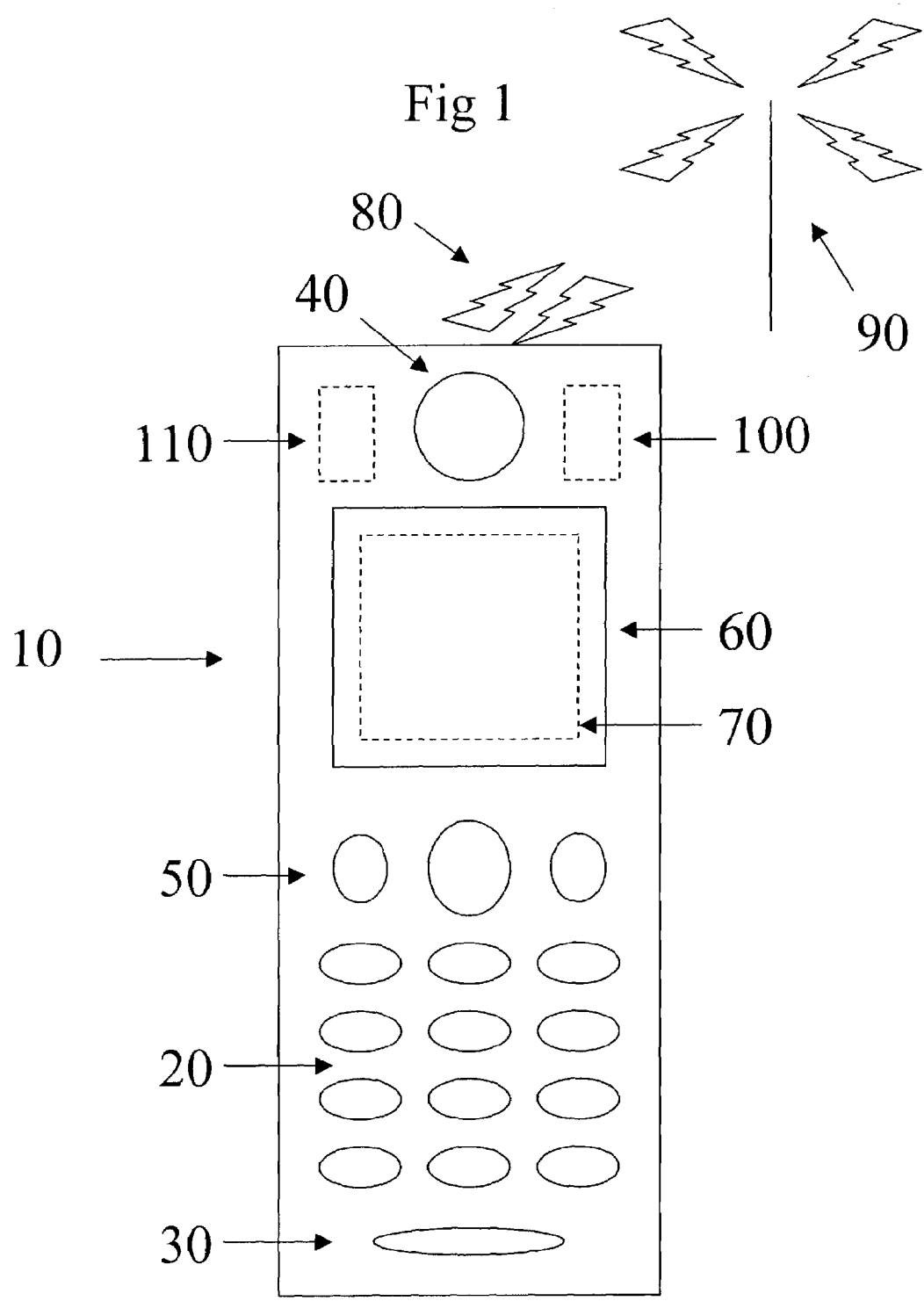

| | | |
|---|---|---|
| JP | 11-066001 | 3/1999 |
| JP | 2000-009480 | 1/2000 |
| WO | WO 00/73916 | 12/2000 |

OTHER PUBLICATIONS

Screen Saver for Nokia 7650 and 3650, printed Mar. 11, 2003, http://www.psiloc.com/nokia/eng/ssaver/7650/index.html.

"Ex-Symbian exec launches mobile software biz", The Register, printed Mar. 11, 2003. http://www.theregister.co.uk/content/39/25417.html.

Screen Saver for Nokia 7650 and 3650, Mar. 11, 2003.

"Drempels", Ryan M. Geiss. http://web.archive.org/web/20010411030126/http://www.geisswerks.com/drempels/.

"Serandom Screensaver Manager" Seraline P/L. http://web.archive.org/web/20001202004800/http://www.seraline.com/serandom.htm.

How to write a 32bit screen saver, Lucian Wischik. http://www.wischik.com/scr/howtoscr.html. Last updated Jul. 2000. 28 pages.

How to use Microsoft Windows NT 4 Workstation. Gavron and Moran. Ziff-Davis Press. Emeryville, CA 1996: pp. 130-131.

* cited by examiner

APPARATUS AND A METHOD FOR PROVIDING INFORMATION TO A USER

TECHNICAL FIELD

The present invention relates to the providing of information to a user and more specifically to a screen saver for use in e.g. a mobile telephone, where the screen saver provides information to the user during the idle state starting the screen saver.

BACKGROUND OF THE INVENTION

Hitherto, screen savers have been pre-defined images or e.g. an image or a piece of music stored in a folder in which the screen saver is instructed to retrieve the image or sound. Predefined animations and so-called flash-files are also known to be used by screensavers.

In EP 0 733 983, a screen saver is described where information is received from a service node and shown on the monitor. This node collects a large amount of information and provides information to a number of users. The type of information and the formatting thereof takes place in accordance with personal settings for each user. However, all information in this screen saver is derived from outside the computer and relates to applications not performed on the computer.

SUMMARY OF THE INVENTION

In a first aspect, the invention relates to a wireless terminal comprising:
 a display for providing information, such as data or video, to a user,
 one or more central processing unit(s) for executing a number of applications,
 a memory for holding information stored therein by the applications, wherein one or more of the central processing units being able to execute, during an idle state, an idle state display handling application for:
 deriving information from the memory, the information having been stored by each of a plurality of the applications, and
 providing the derived information on the display.

Thus, according to the present invention, information from the applications is provided to the user during the idle state.

In e.g. mobile telephones or PC's it has been noticed that the user actually frequently glimpses at the monitor or display also when not using the telephone/PC. Thus, it is desirable to actually use this display/monitor to provide useful information, such as reminders or the like to the user even when the computer/telephone is not in use. Depending on the user, the information provided may be information reminding the user of something or someone, or other information the user desires to see frequently.

In the present context, the plurality of the applications preferably comprise applications relating to receiving information from the user.

The information entered by the user may be information for use by an application either for the application to store in e.g. a database or to perform a desired action, such as to provide desired information. In that situation, the information may be navigational information for navigating in e.g. a menu structure or database.

In the present context, the deriving of information from an application will mean deriving information from information handled, maintained or stored by the application in the apparatus.

The idle state may then be a state where the user enters no information to any of the applications or where the user has not entered information for a predetermined period of time. The actual providing of the derived information may not take place until after a predetermined period of time. In the preferred embodiment, the idle state and the information provided is a screen saver where, instead of the standard screen saver images (a fixed bitmap or the time), useful information is shown to the user: information taken from the applications on the apparatus—such as a mobile telephone.

In the preferred embodiment, the providing means are adapted to provide information stored by each of the plurality of applications in a subsequent manner. In this manner, information is firstly provided from a first application and then from another. Naturally, one application may provide different pieces of information immediately following each other without being interrupted by information from another application.

Especially when the terminal is a portable computer or handheld unit, such as a mobile telephone, each application could relate to providing to the user one or more of:
 a calendar, where the derived information may be one or more items thereof,
 a to-do-list, where the derived information may be one or more items thereof,
 messages to and/or from an external provider, such as mails/SMS/MMS, where the derived information may be the number of messages, contents thereof, or the fact that e.g. unread messages exist,
 calls to and/or from an external entity, such as standard telephone calls,
 a stopwatch, where the derived information provided is one or more finishing or intermediate times, graphs over times, or the like—normally stored in a memory of the apparatus,
 information relating to available resources or services, such as connectivity/coverage, servers connected,
 a thermometer, where the derived information may be an actual or historic temperature or a temperature graph—normally stored in a memory of the apparatus,
 a microphone, where the derived information may be recorded sound, sound intensity, or a sound intensity graph,
 a watch, where the derived information may be the actual time in any relevant time zone or zones, and
 images, music/audio, and/or video, such as received from the external provider or retrieved from a storage of the apparatus.

An interesting aspect is one wherein at least one of the plurality of applications is adapted to provide information for the deriving means, the information relating to the information to be derived from the application by the deriving means. Thus, the applications themselves may determine which information, if any, is to be provided. This facilitates subscription where a newly added application (such as one downloaded into the apparatus) may itself upon activation start functioning also during the idle state.

In an alternative embodiment, the idle display handling application is adapted to request the information for the deriving means. In this situation, the applications need not inform the idle display handling application by themselves.

In this respect, preferably, the at least one application is further adapted to inform the deriving means that no information is to be derived from the application. This may be performed immediately before removal of the application or before it is rendered inoperable. Naturally, this situation may also occur during operation of the application when it is determined that e.g. information stored or maintained by that application is simply not to be provided.

Also, in this respect, at least one application is preferably adapted to provide information relating to a position in the memory of the information to be derived.

Thus, the information to be provided may be taken directly from its position in the memory. This has the advantage, over the situation where the data is copied to e.g. a specific folder, that memory, which may be a critical resource, may be saved.

Also, the user may determine how to transition from one piece of information to the next, such as sliding effects, overlapping effects, the frequency of information change, maximum time for each application etc. Naturally this could also be determined by the screen saver application as well.

In a particular embodiment, the at least one application is adapted to provide, as part of the information relating to the information, instructions to the one or more processing units as to how to provide the pertaining information. This at least one application could then be adapted to provide instructions to the fact that the at least one central processing unit must keep providing the pertaining information until a predetermined action has taken place. Also, the instructions could relate to a priority of the information.

This embodiment relates to a situation where the idle display handling application may e.g. be locked to providing a particular piece of information of exceptional relevance. If multiple applications have such information, the priority can help the idle display handling application to determine which one is the most important. In addition to or instead of the application(s) itself/themselves determining which information is to be provided, the terminal could further comprise a keyboard for the user to identify which information from one or more of the applications is to be provided during the idle state. For a number of embodiments of the present apparatus, a large amount of the information e.g. held thereby is not to be published on an idle display, monitor or the like. If an application is a calendar, certain meetings are desirably kept secret, as are certain types of messages in a mail system or SMS'es in a mobile telephone. The relation between the user and some contacts in a contacts application might not be desired published either. Thus, the user may be able to himself e.g. mark information that is or is not to be provided during the idle state.

In addition, preferably, the wireless terminal further comprises means for providing, on the providing means, predetermined information, as derived information, in one predetermined manner during the idle state and the predetermined information in another manner during a state other than the idle state. The other state being any state where the user e.g. enters information or has been doing that within e.g. a predetermined period of time.

For a number of reasons it may be desired to provide the derived information in a different manner during the idle state than that normally used. One situation may be when the information to be provided is larger than what may be provided on the providing means at the same time. If, in the normal operation of the corresponding application, the user is able to e.g. scroll through the information or otherwise control the providing of the information, the providing of the information during the idle state is normally not controlled by the user at that point in time. Thus, this information may be reduced (such as to only a headline) and the reduced information provided, or the information may be provided part by part in sequence.

There may be other reasons for desiring to reduce the amount of information to be provided, such as in order to reduce the power consumption. Thus, colour information may be reduced to Black/White information and audio contents may be removed or reduced (such as in intensity or frequency contents).

Also, having now provided a terminal where information from applications is provided on the providing means, it may be desired that the user is able to tell the difference between the idle state and a state in which the terminal is in operation. This, again, may be seen if reduced information is provided or the information is, e.g. provided in a reduced part of the providing means. This also reduces the power consumption in the idle state.

A second aspect of the invention relates to a method for providing information to a user on a wireless terminal comprising a display for providing information, such as data or video, to a user. The method includes the steps of:
  executing, on one or more central processing unit(s), a number of applications,
  a plurality of the applications storing information in a memory, and
  one or more of the central processing units executing, during an idle state, an idle state display handling application:
    deriving information from the memory, the information having been stored by the plurality of applications, and
    providing the derived information on the display.

Preferably, as is stated above, the executing of the plurality of the applications comprises performing applications relating to receiving information from the user.

Then, the idle state may be a state wherein no information has been received from the user in a predetermined period of time.

Preferably, the performing of the plurality of the applications comprises performing applications each relating to receiving information from the user or receiving information from or transmitting information to an external data source or receiver. Then, the performing of each application could relate to providing to the user one or more of:
  a calendar,
  a to-do-list,
  messages to and/or from an external provider,
  calls to and/or from an external provider,
  a stopwatch,
  a thermometer,
  a microphone,
  a watch,
  images,
  music/audio, and
  video.

Preferably, the providing step comprises providing information stored by each of the plurality of applications in a subsequent manner.

In a particular embodiment, the performing of at least one of the plurality of applications comprises providing information for the deriving means, the information relating to the information to be derived from the application during the deriving step. In that embodiment, the performing of at least one application could comprise informing the deriving means that no information is to be derived from the application. Also, the step of providing the information relating to the information to be derived comprises providing information relating to a position in the memory of the information to be derived.

In an alternative embodiment, the idle state handling application requests the information for the deriving step.

In a preferred embodiment, the step of providing the information relating to the information to be derived comprises providing instructions to the one or more processing units as to how to provide the pertaining information. Then, the step of providing the instructions may comprise deriving instructions making the at least one central processing unit keep providing the pertaining information until a predetermined action has taken place. Also, the step of providing the instructions could comprise providing information relating to a priority of the information.

In addition, the user may desire to identify which information from one or more of the applications is to be provided during the idle state.

It may be advantageous to provide, on the providing means, predetermined information, as derived information, in one predetermined manner during the idle state and the predetermined information in another manner during a state other than the idle state.

DESCRIPTION OF ACCOMPANYING DRAWINGS

FIG. 1 is a schematic view of an apparatus according to the present invention illustrating in particular the user interface.

DETAILED DESCRIPTION OF A PREFERRED EMBODIMENT

In the following, a preferred embodiment of the invention will be described as an improvement of a mobile telephone and with reference to the drawing illustrating in particular the user interface of the mobile telephone.

The mobile telephone 10 has, as is normal for mobile telephones, a keyboard 20, a microphone 30, a speaker 40, navigation/instruction keys 50, and a display 60 (which display may be any type of display, such as a LED display, a plasma monitor, a CRT monitor or a LCD, active or inactive matrices).

The mobile telephone 10 communicates as indicated by 80 via a station 90 with the normal services, other telephones etc.

Presently, mobile telephones 10 are able to run a number of applications apart from that relating to the telephone calls.

Such applications are the maintaining of calendar functions, To-Do-lists, and/or contact information, information on available resources (servers available, GSM coverage, connectivity, internet, etc).

Also, the mobile telephones may be used as a stopwatch, a thermometer, a camera, a sound recorder, and/or a shock recorder.

Furthermore, the telephones are adapted to generate or receive images, videos, audio, and/or other information, such as the time.

These applications are run on a processor (such as a standard processor, a RISC processor, a SPARC processor, a DSP, CISC, or a software programmable processor) indicated by 100 in the telephone 10 and each application may store and retrieve information in or from a storage (such as a RAM, ROM, a PROM, a EPROM, a EEPROM, a disc, an optical disc, an optical memory, or a tape memory) indicated by 110 in the telephone 10.

The present embodiment relates to the use of an idle state where the user is not using the telephone (such as entering information or navigating in the telephone's menus).

Instead of just shutting the display of the telephone down in order to save power or providing a standard user-defined screen saver—where the user may pre-determine a fixed bitmap—or the time—or the like to be shown when the telephone is not in use, the present invention relates to the providing of other information.

A number of applications are run on the telephone (simultaneously or in sequence), and some of these applications maintain information in the memory 110. During the idle state, part of this information is provided, may be combined with other information, in order to provide useful information to the user even when the user is not actively using the telephone.

Often, the user will glimpse at the telephone a number of times during the day—either just before using the telephone or during periods of time when it is not in use. It is desired to provide the user with information at these points in time.

Thus, during the idle state, information from the applications on the telephone is provided on the display.

When starting a new application, such as after having downloaded the application, the application will inform the processor or screen saver application that it has been activated and that it has information to be provided during the idle state. This information to be provided is identified by its position in the memory 110 in order to avoid copying of the information. In mobile telephones, memory is a critical resource. Also, when the application is brought out of operation or is directly uninstalled, it may inform the screen saver that it no longer has information to be provided. In this manner, the screen saver needs not be provided with a full knowledge of all applications, which may have information to be provided. This list of applications may vary—and applications may "subscribe" that were not even known at the time of shipping the mobile telephone with the screen saver.

In another embodiment, the screen saver may actively, such as at frequent intervals, query the applications whether they have information to be provided.

The user may configure the screen saver application in order to determine what information to display, when to display it (for how long the telephone must be idle before starting the screen saver), how to change between information being displayed (transition effects, such as sliding information, overlapping information or other manners of shifting from one piece of information or view to another), how to show different types of information (see below), and/or what applications are allowed to provide information.

It may also be specified how long an item may take—so that a video clip or audio file is actually interrupted if it would exceed this time period.

Also, due to the fact that, normally, not all information handled by an application is desired to be provided during an idle state where anybody may come across the telephone and gain knowledge of the information provided. Thus, in addition to the settings possible in the configuration of the screen saver, the user may set up each application, so as to identify items or groups of items, if any, which are or are not to be provided by the screen saver.

For, e.g., calendar appointments or messages, it may be desired to not provide outdated appointments or messages that are too old. Also, calendar appointments that are too far into the future may also not be interesting yet.

The information to be provided in the screen saver will normally be information from different applications and having different formats. Such information may be SMS'es, video clips, audio files, calendar appointments, and to-do-items. Thus, an adaptation of these types of information to the information type accepted by the screen saver may be required. Also, the different types of information may comprise too much information to be provided on the display 60 at one time. Thus, it is determined how to either reduce the information in the item or how to divide the item in order to provide parts thereof in sequence.

Another aspect is power consumption. Thus, in this embodiment, the information is provided only in a part, 70, of the display. This also has the advantage that the user will be able to determine that the screen saver is on. Otherwise, the user might mistake the information for the situation where the pertaining application is in operation.

Video clips may be reduced by removing the color information and provide it only in Black/White. Also, any sound track thereof may not be provided. In addition, only a first image thereof may be provided or the number of images per second may be reduced by simply not showing all images.

Audio files may be reduced by reducing the frequency contents thereof. This may be obtained by removing a higher frequency part thereof also in order to make the providing of sound less disturbing for the surroundings.

Images may also be reduced by removing the color information and provide them only in Black/White.

Text items, which are so large that they cannot be provided in the display 60 or the part 70 at one time, may either be reduced in contents, such as to a reduced part, which may be provided at one time or to e.g. a headline. Otherwise, the items may be split up into parts, which are subsequently displayed in sequence.

An interesting aspect is one wherein an application arrives at (determines or receives) information that is important to the user.

Information of this type may be that the battery of the telephone is low, that there is no or low GSM coverage, that it is time to e.g. leave for a meeting or the like.

In that situation, the application may inform the screen saver of this information and instruct it to keep providing this information until a given action has taken place, such as until the user has pressed a button as a sign that he/she has read the information.

In fact, a number of such different applications may run. These applications may have, at the same time, information to show, whereby their information may be prioritized in order for the screen saver to know which information is the most important—and where the next-most important information is provided when the predetermined action has been registered for the most important information. Once all this overriding information has been read, the screen saver may resume its normal function.

The present embodiment has been described as a mobile telephone. However, it is clear that the same functionality will be advantageous on other stationary or handheld, mobile or stationary devices, such as hand held electronic calendars or computers.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A wireless terminal comprising:
    a display for providing display information, including data or video to a user,
    at least one central processing unit for executing applications, the applications including an idle state display handling application and one or more additional applications;
    a memory for holding application information stored therein by the applications; and
    wherein the at least one central processing unit executes, during an idle state, the idle state display handling application for deriving screen saver information from the memory, at least one of the additional applications provides deriving information for deriving the screen saver information relating to the application information to be derived from the at least one additional application, and the at least one additional application provides, as part of the deriving information relating to the application information, instructions to the at least one processing unit as to how to provide the screen saver information.

2. A wireless terminal according to claim 1, wherein the plurality of the additional applications comprise applications relating to receiving input information from the user.

3. A wireless terminal according to claim 1, wherein the idle state is a state wherein no input information has been received from the user in a predetermined period of time.

4. A wireless terminal according to claim 1, wherein the application information stored by each of the applications is stored in a subsequent manner.

5. A wireless terminal according to claim 1, wherein the idle display handling application requests the deriving information for deriving the screen saver information.

6. A wireless terminal according to claim 1, wherein the at least one additional application informs the idle display handling application that no screen saver information is to be derived from the application.

7. A wireless terminal according to claim 1, wherein the at least one additional application provides, as the deriving information, memory information relating to a position in the memory of the application information to be derived.

8. A wireless terminal according to claim 1, wherein the at least one additional application provides instructions that the at least one central processing unit is to provide the screen saver information until a predetermined action has taken place.

9. A wireless terminal according to claim 1, wherein the deriving instructions related to a priority of the application information.

10. A wireless terminal according to claim 1, comprising means for providing predetermined display information as the derived screen saver information in one predetermined manner during the idle state and the predetermined display information in another manner during a state other than the idle state.

11. A method for providing information to a user on a wireless terminal comprising a display for providing information, including data or video, to a user, the method comprising the steps of:
    executing, on at least one central processing unit, applications, the applications including an idle state display handling application and one or more additional applications;
    a plurality of the additional applications storing application information and providing instructions as to how to provide the application information while in an idle state; and
    at least one of the at least one central processing unit executing, during the idle state, the idle state display handling application for deriving screen saver information from the application information stored in the memory for at least one of the plurality of additional applications according to the instructions provided by the at least one of the plurality of additional applications, providing the derived screen saver information on the display.

12. A method according to claim 11, wherein, for the step of executing the applications, the additional applications comprise applications relating to receiving input information from the user.

13. A method according to claim 11, wherein the idle state is a state wherein no input information has been received from the user in a predetermined period of time.

14. A method according to claim 11, wherein the providing the derived screen saver information comprises providing the derived screen saver information derived from the application information stored by each of the plurality of additional applications in a subsequent manner.

15. A method according to claim 11, wherein the instructions as to how to provide the application information while in the idle state comprises information for deriving the screen saver information from the application information for the at least one of the plurality of additional applications.

16. A method according to claim 15, wherein the idle state handling application requests the information for the deriving the screen saver information from the at least one of the plurality of additional applications.

17. A method according to claim 16, wherein the information for the deriving the screen saver information comprises that no information is to be derived from the at least one of the plurality of addition applications.

18. A method according to claim 15, wherein the information for the deriving the screen saver information comprises information relating to a position in the memory of the application information to be derived.

19. A method according to claim 11, wherein the instructions as to how to provide the application information while in an idle state comprises instructions to provide the screen saver information until a predetermined action has taken place.

20. A method according to claim 19, further comprising receiving input from a user identifying which application information from at least one of the additional applications is to be provided during the idle state.

21. A method according of claim 19, further comprising providing predetermined information, as screen saver information, in one predetermined manner during the idle state and the predetermined information in another manner during a state other than the idle state.

22. A method according to claim 11, wherein the instructions as to how to provide the application information while in an idle state comprises information relating to a priority of the application information.

23. A method according to any of claim 22, further comprising providing predetermined information, as screen saver information, in one predetermined manner during the idle state and the predetermined information in another manner during a state other than the idle state.

24. A method according to claim 11, further comprising receiving input from a user identifying which application information from at least one of the additional applications is to be provided during the idle state.

25. A method according to claim 11, further comprising providing predetermined information, as screen saver information, in one predetermined manner during the idle state and the predetermined information in another manner during a state other than the idle state.

26. An apparatus for displaying, during an idle state, information derived from one or more non-screen saver applications, the apparatus comprising:
a memory device;
a processor coupled to the memory device that performs steps comprising:
storing, in the memory device, information to be displayed during the idle state from the one or more non-screen saver applications;
receiving first data from the one or more non-screen saver applications informing that the one or more non-screen saver applications have the information to be displayed during the idle state;
receiving second data from the one or more non-screen saver applications as to how to provide the information;
executing a screen saver program during the idle state;
deriving screen saver information based on the first and second data; and
displaying the screen saver information during the idle state.

27. The apparatus of claim 26, further comprising:
receiving third data from the one or more non-screen saver applications informing that the one or more non-screen saver applications no longer has the information to be displayed during the idle state; and
based on receiving the third data, failing to perform the step of displaying the saver information.

28. The apparatus of claim 26, wherein the first information comprises positions in the memory device of the information to be displayed during the idle state.

29. The apparatus of claim 26, wherein the apparatus comprises a wireless communication device.

* * * * *

UNITED STATES PATENT AND TRADEMARK OFFICE
CERTIFICATE OF CORRECTION

| | | |
|---|---|---|
| PATENT NO. | : 7,113,809 B2 | Page 1 of 1 |
| APPLICATION NO. | : 10/322551 | |
| DATED | : September 26, 2006 | |
| INVENTOR(S) | : Mads Osterby Noesgaard et al. | |

It is certified that error appears in the above-identified patent and that said Letters Patent is hereby corrected as shown below:

In the Claims, Claim 11, Column 8, Line 62:
   Replace "application information and providing instructions" with -- application information in a memory and providing instructions--

In the Claims, Claim 11, Column 9, Line 5:
   Replace "applications, providing" with --applications, and providing--

Signed and Sealed this

Third Day of April, 2007

JON W. DUDAS
*Director of the United States Patent and Trademark Office*